Figure 1:
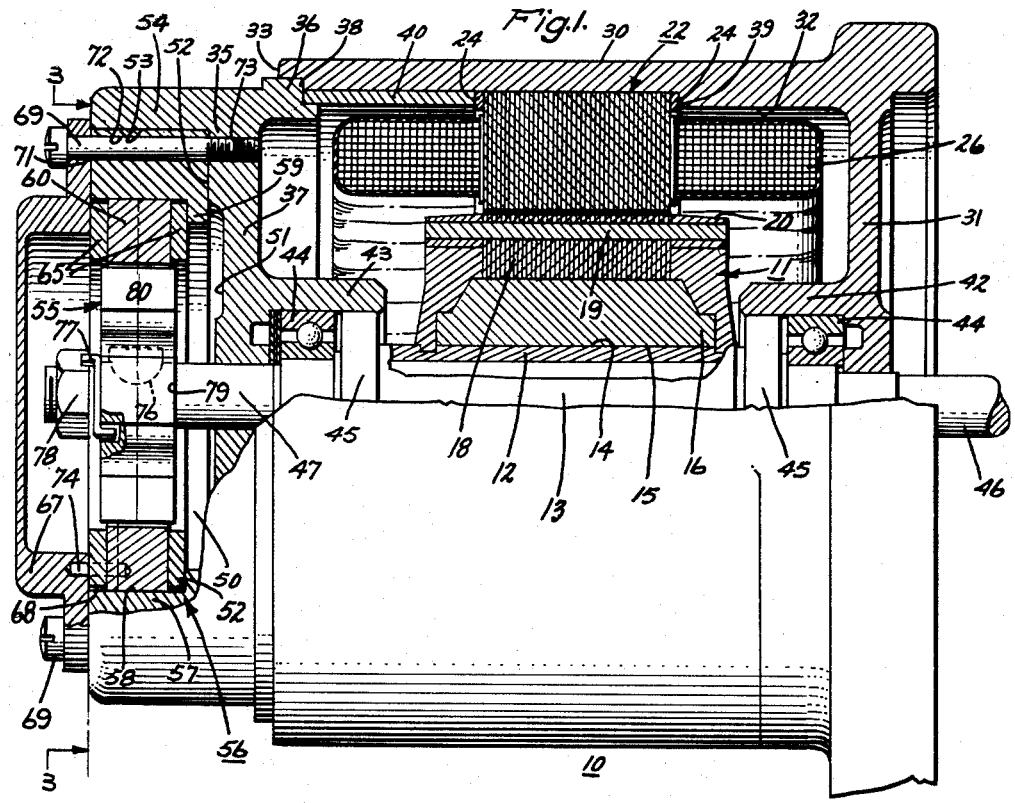

March 30, 1965  L. C. BOLYARD  3,176,174
DYNAMOELECTRIC MACHINE BRAKING AND MAGNETIC
HOLDING ARRANGEMENT
Filed June 1, 1962  3 Sheets-Sheet 1

Inventor:
Lewis C. Bolyard,
by John M. Stoudt
Attorney.

March 30, 1965  L. C. BOLYARD  3,176,174
DYNAMOELECTRIC MACHINE BRAKING AND MAGNETIC
HOLDING ARRANGEMENT
Filed June 1, 1962  3 Sheets-Sheet 2
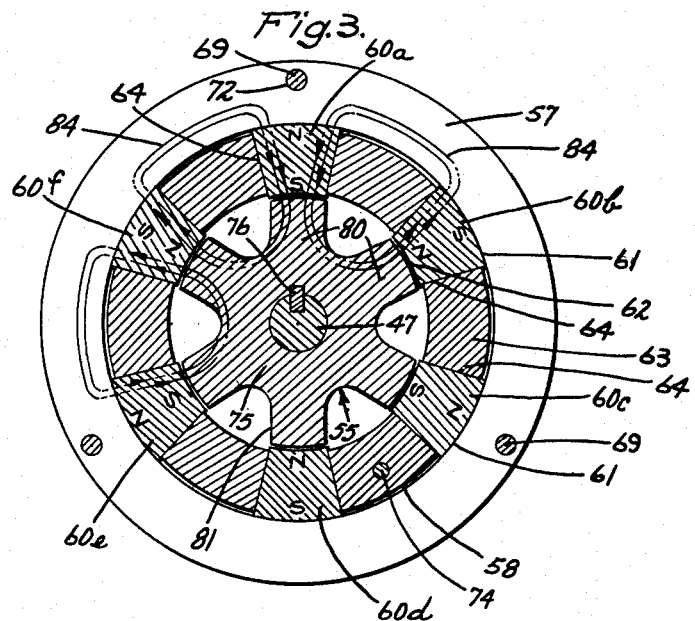
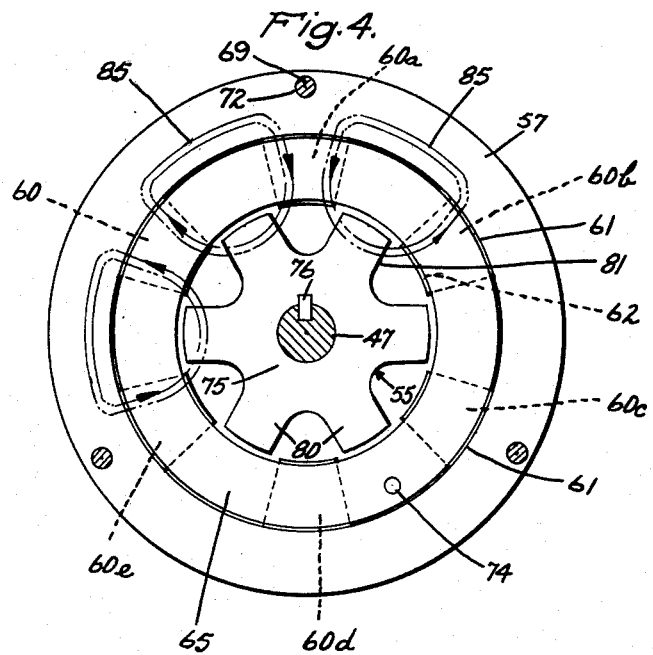
Inventor:
Lewis C. Bolyard,
by John M. Stoudt
Attorney.

Inventor:
Lewis C. Bolyard,
by John M. Stoudt
Attorney.

United States Patent Office 3,176,174
Patented Mar. 30, 1965

3,176,174
DYNAMOELECTRIC MACHINE BRAKING AND
MAGNETIC HOLDING ARRANGEMENT
Lewis C. Bolyard, Fort Wayne, Ind., assignor to General
Electric Company, a corporation of New York
Filed June 1, 1962, Ser. No. 199,401
11 Claims. (Cl. 310—93)

This invention relates generally to braking and holding arrangements for dynamoelectric machines and in particular to an improved device adapted to cooperate with a motor to effect a rapid braking and magnetic locking action on the rotor assembly of the motor.

In certain dynamoelectric machine applications, such as synchronous type motors for driving a number of nuclear reactor rods in unison at accurate speeds, there has been a practical difficulty in providing an extremely reliable yet inexpensive device which not only assists in stopping rotation of the rotor assembly as quickly as possible and prevents movement of the driven load once the operation of the motor has ceased, but in addition is capable of performing the aforementioned functions with infallibility even though the motor may experience a power failure. It is also desirable that such arrangement be readily incorporated in commercially available motors; e.g., synchronous induction motors, with a minimum of over-all motor modification and installation costs.

Accordingly, it is the general object of the present invention to provide an improved, yet economical torsional braking and holding arrangement for dynamoelectric machines, and it is a more specific object to do so by a construction having the desirable features described above.

It is a further object of the present invention to provide an improved device, suitable for incorporation in a synchronous type motor, which includes a part adapted to be connected to the motor sahft at all times and creates a predetermined holding torque to lock the shaft in a positive manner against rotation below preselected inertia loads without interfering with the operating synchronous speed of the motor.

In carrying out my invention in one form thereof, I provide an improved braking and magnetic holding arrangement particularly suitable for use in connection with a synchronous induction motor having a polyphase winding and a permanent magnet rotor and shaft assembly adapted to drive a mechanism at synchronous speed. The motor includes a magnetic holding device in which a rotary member of magnetizable material is formed with a hub section for attachment to the shaft and a preselected number of salient poles projecting outwardly from the hub in cooperative relation with a stationary member for developing a predetermined holding torque capable of preventing rotation of the shaft below a certain speed of revolution and system inertia or torque transmitted by the shaft to the rotary member. The stationary member includes an even number of spaced apart permanent magnets arranged within a yoke annulus, with the inner faces of the magnets being of alternate polarity and defining a bore for receiving the rotary member. The magnets are preferably encircled with material to resist their demagnetization as well as for maintaining them in intimate contact with the annulus. To develop effective locking torque and to achieve satisfactory operation, the total number of magnets to the number of salients should be an odd integer and the total circumferential length at the bore of the magnets and salients should be in the range of 40–48% of the bore circumference.

For reducing the operative speed of the motor rapidly from running conditions to the speed where the torque developed by the holding device becomes effectual, the polyphase windings may be conveniently short circuited in all winding phases thereby in cooperation with the permanent magnet rotor, producing a braking effect on the shaft assembly. Once the motor has been brought to a complete stop, the holding device will prevent rotation of the motor rotor and shaft assembly until the motor is energized and the holding torque is overcome by a greater force transmitted to the rotary member of the holding device through the intermediary of the rotor and shaft assembly of the motor.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawings.

Figure 2:
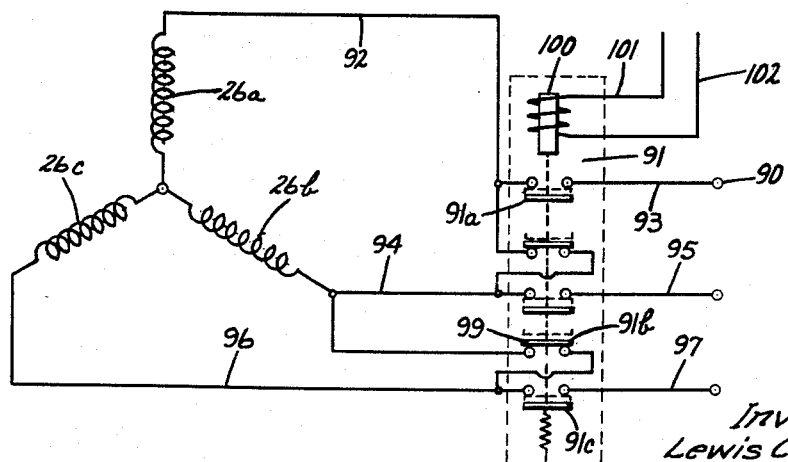
Figure 6:
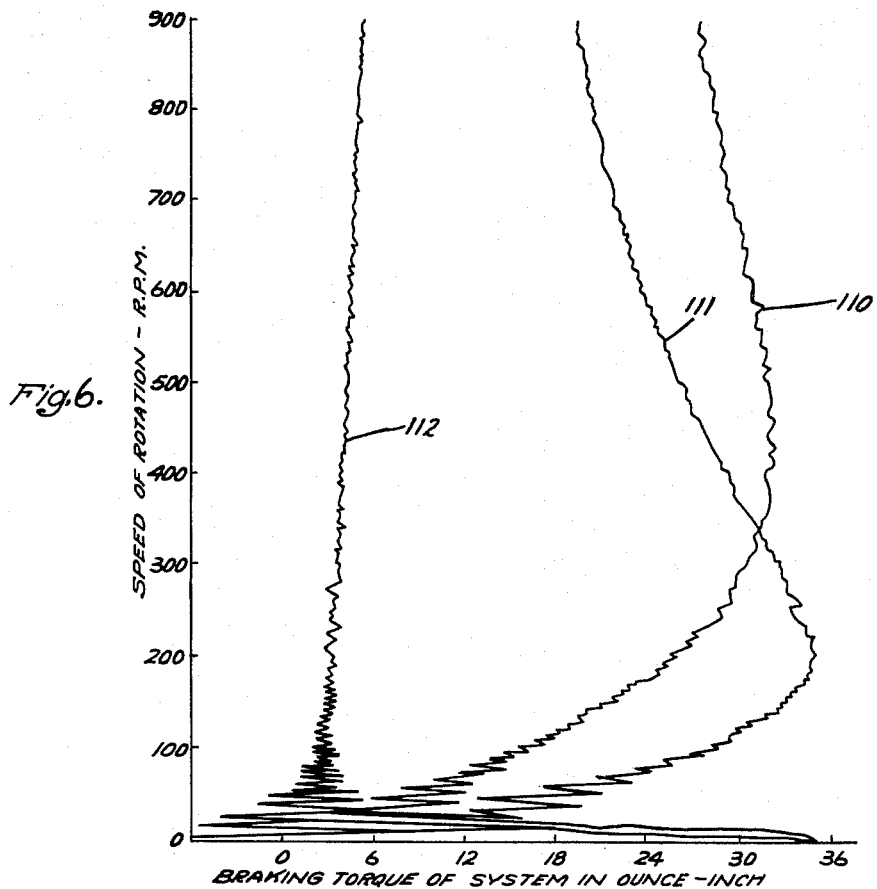
Figure 5:
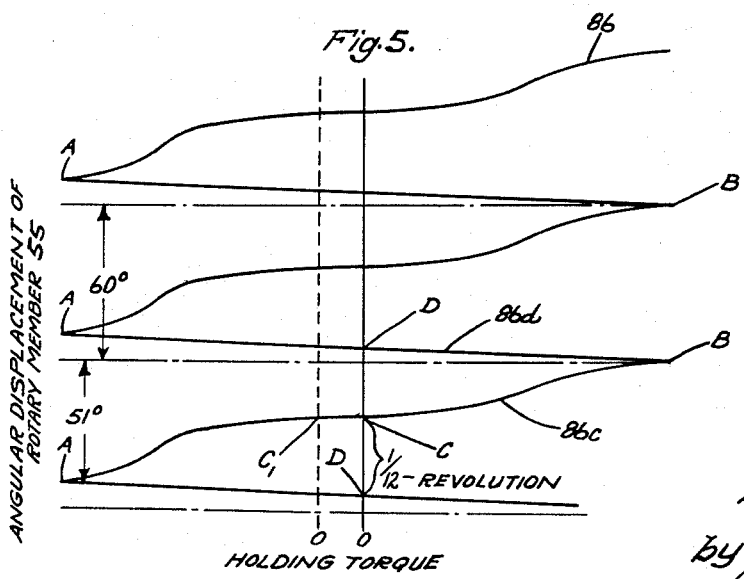

In the drawings:
FIG. 1 is a side view, partially in section, showing the preferred form of the invention incorporated in a small horsepower polyphase synchronous type motor;
FIG. 2 is a schematic diagram illustrating the circuitry of the motor of FIG. 1;
FIG. 3 is a sectional view taken along line 3—3 in FIG. 1 to show the magnetic lines of force through the holding device when in the minimum reluctance position;
FIG. 4 is an end view of the holding device of FIG. 1 to illustrate the magnetic lines of force through the device when disposed in the approximate maximum reluctance position;
FIG. 5 is a graph of the locking torque generated by my invention as a function of salient rotor displacement; and
FIG. 6 is a graph showing typical speed versus braking and stopping torque curves for a motor employing my new and improved arrangement.

Turning now to FIG. 1, for purposes of explanation and disclosure, my invention is illustrated in connection with a small horsepower polyphase synchronous induction type motor 10, employing rotor 11 constructed in accordance with that set forth in U.S. Patent 2,643,350, granted to F. W. Merrill and assigned to the same assignee as the present invention. Briefly described, the rotor includes a central bushing 12 of magnetic material (e.g., steel), mounted on a shaft 13 and formed with flat peripheral surfaces 14 for engaging the lower faces 15 of a number (e.g., six) of radially polarized spaced apart blocks 16 of permanent magnet material, such as one of the aluminum-nickel-cobalt-iron alloys commonly known as Alnico. The individual block configurations are fusnished as described and claimed in the aforementioned Merrill patent. A laminated sleeve member 18 of soft iron or steel surrounds the blocks and carries squirrel cage bars 19 short-circuited by end rings 20 to provide an induction motor secondary winding. The stator 22 of motor 10 is of conventional design and has a laminated core 23 provided with the usual insulator 24 at each side thereof, a rotor receiving bore 25, and suitably insulated slots for accommodating a primary field excitation winding 26, such as a three phase Y-connected winding composed of winding phases 26a, 26b and 26c schematically illustrated in FIG. 2.

To house rotor 11 and stator 22 and to support them for relative rotation, as seen in FIG. 1 motor 10 includes a casing, cast of suitable material like aluminum, having a cylindrical axially extending wall portion 30 and an integral end wall portion 31, which together define a motor enclosure 32 open at cylindrical end 33. An end closure member 35, arranged at open end 33 of the casing, is formed with an annular flange 36 at the outer periphery of radial wall portion 37 for mating engagement with a complementary groove 38 in an interfitted rabbeted type connection for securement purposes. The stator is held firmly against shoulder 39 within enclosure 32 by a cylindrical spacer 40 and the flange 36 of closure member 35.

Bearing hubs 42 and 43, formed respectively in wall portions 31 and 37, extend axailly inward of enclosure 32 to mount base bearing 44 for rotatably carrying shaft 13 and thrust bearing assembly 45 for limiting axial movement of rotor 11. Shaft 13 has its one end 46 projecting through and beyond wall 31, which acts as the output end of the whole mechanism and is adapted to drive a load (not shown) such as a reactor rod.

The other end 47 of the shaft extends through wall 37 of member 35 and into a cavity 50 formed by radial surfaces 51, 52 of wall 37 and surface 53 of an outer wall 54, extending away from the motor enclosure 32. This cavity is adapted to house a torque producing and locking device, now to be described in connection with FIGS. 1 and 3, which by an important feature of the invention in the present exemplification functions primarily to prevent in a positive and reliable way angular motion of rotor 11 and shaft 13 below a predetermined system inertia load.

In the preferred embodiment, the device comprises cooperating rotary and stationary members 55 and 56 in which the stationary member 56 has a yoke annulus or ring 57 of solid magnetic material, e.g., Arnico iron, and an even number of generally similar equally spaced apart magnets 60 arranged circumferentially within the annulus. Six magnets are shown in the drawings and are individually identified by letters $a$–$f$ inclusive. Each magnet is polarized radially to furnish opposed positive (N) and negative (S) poles at the outer and inner magnet faces 61, 62, with the six inner faces 62 together defining a bore and providing regions of alternating polarity around the circumference of the bore, as indicated in FIGS. 3 and 4 by the "N" and "S" legends. Non-magnetic material, for example aluminum casting 63, surrounds sides 64 of each magnet, permitting faces 61, 62 to extend radially beyond the casting, and is joined at each end by an integral ring 65. This casting construction furnishes in effect a short-circuited winding, which acts as an amortisseur winding and shields the magnets tending to prevent their de-magnetization. By tapering magnet sides 64 from a maximum width at outer face 61 to a minimum dimension at inner face 62, the casting also serves as a means for retaining the protruding outer magnet faces 61 in tight engagement, as by an interference type connection, with the inner surface of ring 57 which may include a lip 59 to limit the axial position of the magnet within the yoke ring. I have found that for simplicity and economy of manufacture, prior to assembly of the magnets into ring 57, it is convenient to cast the aluminum around the magnets while they are held in an arbor, and thereafter machine or otherwise turn down the outer faces 61 to the proper dimensions to achieve the interference fit with ring 57. When the magnets and the casting are finally pressed as a unit into ring 57, the position shown in FIG. 1 with one of the cast rings 65 abutting ring lip 59, the interference fit exerts pressure on magnet faces 61 towards the center of the device, thereby insuring an intimate contact between the casting and the magnet sides 64 as well as between the faces 61 and ring surface 58.

The illustrated manner in which I mount stationary member 56 in cavity 50 is clearly revealed in FIG. 1 where it shows ring 57 in the confines of walls 52, 53, and an imperforate non-magnetic retainer 67 in abutting relation with the outside surface of member 35, securely fastening the ring in place between retainer wall 68 and cavity wall 52. Securement of the parts may be achieved by a plurality of bolts 69 passing through suitably aligned apertures 71, 72 in the retainer and ring, and into threaded holes 73 provided in wall 37. An aligning pin 74 may be employed between casting 63 and retainer 67 to compensate for the lack of close tolerances of the locked together parts.

Turning now to the rotary member 55 of the holding device and still referring primarily to FIG. 1, it is composed of a solid magnetizable central hub section 75 fastened securely onto shaft end 47 to rotate with shaft 13 in any convenient way, as by a key 76, and a lock washer 77 and nut 78 for holding the hub against shaft shoulder 79. A plurality of integral magnetizable salients 80 project outwardly at equal angular intervals from hub 75 toward faces 61 of the magnets to form air gaps or scalloped out intersalients 81 and salient poles, which in the illustrated embodiment, correspond in number to that of magnets 60. For reasons which will become more apparent from the following explanation, I have determined that in order to obtain optimum benefit of my invention and to produce the most effective and satisfactory torque characteristics of the holding device, the circumferential length of the individual magnet faces 62 and the salient poles 80 at the bore should be in the range between 40–48% of the total bore circumference, preferably 45%. Moreover, for symmetrical structure, such as that illustrated, the ratio of the total even number of magnets to the total number of salient poles should be an odd integer.

The utility and cooperative relation of magnets 60 and salient poles 80 can best be appreciated in connection with FIGS. 3, 4, and 5. It is an inherent characteristic of a line of flux that it will travel the path of least reluctance. As seen in FIGS. 3 and 4, with intersalients 81 forming a barrier for the magnetic flux, the holding power of the device is achieved as salient poles 80 attempt to avoid the relatively high reluctance path caused by the intersalient cuts by aligning themselves radially with magnet 60. FIG. 3 illustrates the theoretical minimum reluctance path position of rotary member 55 in which salient poles 80 are directly beneath magnet pole faces 62. The magnetic path or circuit, when member 55 is in this position, is indicated by lines of flux 84 which travel through yoke annulus 57, salient poles 80 and hub 75, from the south (S) pole of each magnet to its north (N) pole. In FIG. 4, rotary member 55 is in its theoretical maximum reluctance path position where the lines of flux 85 are forced to go from the S pole of the magnets, across the high reluctance cut out intersalients 81 and thence through the salient poles 80 to the adjacent magnet poles N. The result of such high magnetic reluctance is that at relatively low speeds of rotation for shaft 13, the developed torque will tend to cause member 55 to assume the position of FIG. 3. In addition, in symmetrical constructions, this torque will be developed of sufficient magnitude for holding purposes only when the total number of magnets is even (to obtain the alternate polarity at the bore) and the ratio of this number to the number of salients is an odd integer.

The manner in which shaft 13, and consequently, the driven load, is prevented from movement below a predetermined system inertia, that is, the inertia resulting from the load, rotor 11 and its shaft 13, and member 55, may be understood from FIG. 5. Curve 86 represents the holding torque of the device as a function of the angular displacement of the center of salient poles 80 relative to the center of magnet faces 61. During one cycle of operation of member 55, one sixth revolution in the preferred embodiment, the holding torque generated by the device is a maximum at points A and B on the curve and theoretically zero (minimum) at center points C and D, which correspond to the reluctance positions illustrated in FIGS. 3 and 4 respectively. The greatest locking torque, points A and B, is developed at some displacement of rotary member 55 between the respective positions shown in FIGS. 3 and 4.

Since salient poles 80 are continuously trying to line up with magnet pole faces 62 (FIG. 3), the position of FIG. 4 and the section of the curve denoted by character 86d, on which point D is located, are unstable in nature while point C, the center point of curve section 86c, is the theoretical equilibrium point for member 55. It will be recognized that in actual practice the equilibrium point of the device will assume a situs on curve section 86c other than center point C, such as point C', the exact location on section 86c being dependent upon the direction and magnitude of the system inertia on member 55 transmitted to it through the intermediary of shaft 13 at any given instant. As long as points A and B are constantly of greater magnitude than the torque of the inertia system, the holding device will be effective to prevent rotation of shaft 13. The angular distance between points A and B (curve section 86c) and the torsional values of these points are most effectual when the magnets 60 and salient poles 80 have the specific relationships set out above relative to their total circumferential lengths and number employed. When the torque at A and B is exceeded, member 55 will begin to revolve. For example, in actual practice, six Alnico magnets 60 each having a radial length of ½ inch, a depth of ⅜ inch, and a corresponding number of salient poles 80 of member 55 having an axial length of ½ inch and an outside diameter of two inches, achieved a holding torque at points A, B of approximately 35 ounce-inches.

Further features of the invention will become apparent from a description of the operation of motor 10. I have found that as a practical matter, especially when motor 10 is of the polyphase synchronous type having a permanent magnet rotor particularly well suited to drive reactor rods in unison, a desirable braking means for rapidly reducing the speed of motor 10 from its synchronous speed (e.g. 1200 r.p.m.) down to a speed where the holding device starts to become effective (such as 100 r.p.m. for a given system inertia), is illustrated by FIGS. 2 and 6. The rapid reduction of speed of permanent magnet rotor 11 (and its shaft 13) may be achieved inexpensively by the provision of either a two phase or three phase shorting circuit of winding 26. FIG. 2 illustrates the circuit which may be employed to obtain the three phase short of winding 26. Briefly described, winding phases 26a, b and c may be connected to a suitable three phase power source 90 through a standard type relay switch 91 having normally open sets of contacts 91a, 91b and 91c and normally closed sets 98, 99 to short circuit the winding phases. The illustrated conductors for connecting winding 26 through switch 91 to source 90 are identified by reference numbers 92–97 inclusive. Normally closed contacts 98 are connected across conductors 92, 94 while contacts 99 are attached between conductors 94, 96 to provide the short-circuiting of winding 26. For two phase short circuiting, only one of the normally closed contact sets need be included. Solenoid assembly 100, when energized through lines 101, 102 actuates the five sets of contacts concurrently from the normal positions shown in FIG. 2 to the operated positions illustrated by the broken lines to effect excitation of winding 26.

Turning now to FIG. 6 there is disclosed braking torque vs. speed curves for three shorting conditions of a motor incorporating my invention. These curves are actual plots of test data based upon the performance of a three phase type synchronous motor constructed in accordance with FIG. 1 incorporating the example holding device previously outlined. The motor had a rotor and shaft inertia slightly below 2.8 pound inch$^2$, a 0.38 pound inch$^2$ load inertia, and an overall system inertia slightly over 3.2 pound inch$^2$. The synchronous speed of motor 10 was 1200 r.p.m. Curve 110 represents a two phase short braking from synchronous speed while curve 111 reveals the three phase shorting condition; three shaft revolutions were required before shaft 13 was brought to standstill for the former; four revolutions for the three phase short. Curve 112 shows the braking effect of rotor 11, shaft 13, and rotary member 55 under open circuit conditions, without shorting of the winding phases.

From these three curves in FIG. 6, it will be seen that the holding device offers little resistance to the running operation of the motor after member 55 has been broken away from its locked position (point C' on curve section 86c of FIG. 5) by the excitation of motor winding 26; however, under 100 r.p.m. in the exemplification, rotary member 55 is extremely effective to bring shaft 13 and consequently the driven load to a sudden stop. Below 100 r.p.m., a complete stop (equilibrium point C' of salient poles 80) or cessation of shaft rotation was reached in a maximum of one-sixth revolution for each of the tested conditions shown by curves 110, 111, and 112. This fast stopping action is directly attributable to the number of magnets and salient poles 80 employed. An inspection of FIG. 5 and the angular extent of curve section 86c clearly indicates that there should be at least four magnets, preferably in the order of six. This number permits the use of relatively inexpensive commercially available magnets without necessitating extensive modifications to the magnets.

From the foregoing, the advantages of my invention are readily manifest. Among other things, my inventive and improved arrangement is not only economical, both from manufacturing and simplicity of structure viewpoints, but also it is capable of braking and holding driven loads with infallibility even though power failures may occur. Further, the arrangement is particularly well suited to be used in connection with synchronous induction motors without adversely affecting the synchronous speed characteristics of the motors.

It should be apparent to those skilled in the art, while I have shown and described what at present is considered to be the preferred embodiment of my invention in accordance with the patent statutes, changes may be made in the structure disclosed without actually departing from the true spirit and scope of this invention, and I therefore inend to cover in the following claims all such equivalent variations as fall within the invention.

What I claim as new and desire to secure by Letters Patent of the United States is:

1. For use with a dynamoelectric machine having a rotor and shaft assembly and means for reducing the rotational speed of the assembly to a predetermined speed, a device for stopping rotation of the assembly within one revolution at and below the predetermined speed and for preventing rotary motion of the assembly below a predetermined torque load comprising a stationary member having a yoke annulus of magnetic material, at least four equally spaced apart magnetic poles extending inwardly from said annulus to form a bore having inner pole faces of alternating polarity, and a rotary member adapted to be connected to revolve with the rotor and shaft assembly, said rotary member being formed of magnetizable material and having a central hub section and a plurality of equally spaced apart salients projecting outwardly therefrom toward the stationary member in spaced relationship therewith, the ratio of the number of magnetic poles to the number of salients being an odd integer, and the total circumferential length of said salients and magnet faces adjacent the bore being not substantially less than 40% nor substantially greater than 48% of the bore circumference.

2. For use with a dynamoelectric machine having a rotor and shaft assembly, a device comprising a stationary member having a yoke annulus of magnetic material, an even number of equally spaced apart permanent magnets arranged within said annulus with each magnet polarized radially to form opposed positive and negative poles at the outer and inner faces of the magnet, said inner pole faces defining a bore having poles of alternate polarity, means comprising non-magnetic material encircling the sides of said magnets for resisting demagnetization thereof and a rotary member adapted to be connected to revolve with the rotor and shaft assembly formed of magnetizable material having spaced apart salients arranged in spaced relation with said inner pole faces, the total circumferential length of said salients adjacent the bore being not substantially less than 40% nor substantially greater than 48% of the bore circumference.

3. For use with a dynamoelectric machine having a rotor and shaft assembly, a device for preventing continuous motion of the assembly below a predetermined torque load comprising a stationary member having a yoke annulus of magnetic material, an even number of equally spaced apart permanent magnets arranged within said annulus with each magnet being inwardly tapered and polarized radially to form opposed positive and negative poles at the outer and inner faces of the magnet, said inner pole faces forming a bore having poles of alternating polarity, means for maintaining said outer faces of the magnets in intimate engagement with said annulus, and a rotary member adapted to be connected to revolve with the rotor and shaft assembly and formed of magnetizable material having a central hub section and a number of equally spaced apart salients projecting outwardly therefrom in spaced relation with said stationary member, the ratio of the number of magnets to the number of salients being an odd integer.

4. For use with a dynamoelectric machine having a rotor and shaft assembly, a device for preventing rotary motion of the assembly below a predetermined torque load comprising a stationary member having a yoke annulus of magnetic material, an even number of equally spaced apart magnetic poles extending inwardly from said annulus to form a bore having inner pole faces of alternate polarity, and a rotary member adapted to be connected to revolve with the rotor and shaft assembly, said rotary member being formed of magnetizable material and having a central hub section and a number of equally spaced apart salients projecting outwardly therefrom toward the stationary member in spaced relationship therewith, the ratio of the number of magnetic poles to the number of salients being an odd integer, and the total circumferential length of said salients at the bore not substantially exceeding the range of 40% to 48% of the bore circumference.

5. For use with a dynamoelectric machine having a rotor and shaft assembly, a torque producing device comprising a stationary member having a yoke annulus of magnetic material, an even number of equally spaced apart permanent magnets arranged within said annulus with each magnet being inwardly tapered and polarized radially to form opposed positive and negative poles at the outer and inner faces of the magnet, said inner pole faces defining a bore having poles of alternate polarity, means comprising non-magnetic cast material encircling the sides of said magnets for resisting demagnetization thereof and for maintaining said outer magnet faces in intimate engagement with said annulus, and a rotary member adapted to be connected to revolve with the rotor and shaft assembly formed of magnetizable material having spaced apart salients arranged in spaced relation with said inner pole faces.

6. For use with a dynamoelectric machine having a rotor and shaft assembly, a torque producing device effective to prevent rotary motion of the assembly below a predetermined inertia and shaft speed comprising a stationary member having a yoke annulus of magnetic material, an even number of equally spaced apart permanent magnets arranged within said annulus with each magnet being inwardly tapered and polarized radially to form opposed positive and negative poles at the outer and inner faces of the magnet, said inner pole faces of adjacent magnets having opposite polarities, and forming a bore, means comprising non-magnetic cast material encircling the sides of said magnets for resisting demagnetization thereof and for maintaining said outer faces of the magnets in intimate engagement with said annulus, and a rotary member adapted to be connected to the rotor and shaft assembly formed of magnetizable material having a central hub section and a member of equally spaced apart salients projecting outwardly therefrom in spaced relationship with said inner faces, the ratio of the number of magnets to the number of salients being an odd integer, and the total circumferential length of said salients at the bore being not substantially less than 40% nor substantially greater than 48% of the bore circumference.

7. A dynamoelectric machine comprising an induction type electric motor having a stator, a rotor, a shaft carrying said rotor for relative rotation with said stator, means for reducing the speed of shaft rotation rapidly from running speed, and a torque producing device for augmenting the speed reducing means at lower speeds of shaft rotation and for preventing rotation at low torque loads applied to said shaft, said device including stationary and rotary members with said rotary member arranged to be connected to revolve with said shaft, said stationary member having a yoke annulus of magnetic material, at least four equally spaced apart magnetic poles extending inwardly from said annulus to form a bore having inner pole faces of alternating polarity, said rotary member being formed of magnetizable material and having a central hub section and a plurality of equally spaced apart salients projecting outwardly therefrom toward the stationary member in spaced relationship therewith, the ratio of the number of magnetic poles to the number of salients being an odd integer.

8. A dynamoelectric machine comprising a polyphase synchronous induction motor including a stator having a three phase alternating current winding, a rotor formed with a number of permanent magnets, a shaft carrying said rotor for relative rotation with said stator, at least two winding phases arranged to be short circuited for rapidly reducing the speed of rotation of said shaft, and a torque producing device for augmenting the speed reduction at lower speeds of shaft rotation and for preventing shaft rotation at low torque loads applied to said shaft, said device including stationary and rotary members with said rotary member arranged to be connected to revolve with said shaft, said stationary member having a yoke annulus of magnetic material, at least four spaced apart poles extending inwardly from said annulus to form a bore having inner pole faces, said rotary member being formed of magnetizable material and having a central hub section and a plurality of equally spaced apart poles projecting outwardly therefrom toward the stationary member in spaced relationship therewith, the poles of one of said members being defined by permanent magnets of alternate polarity at said bore, the ratio of the number of poles of said magnets to the number of poles of the other member being an odd integer.

9. A dynamoelectric machine comprising a housing having at least two communicating cavities, a stator mounted within one of said cavities, a rotor, a shaft carrying said rotor for relative rotation with said stator, said shaft having an output end projecting beyond said housing and the other end extending into the other cavity, means for rapidly reducing the speed of said shaft, and a torque producing device for augmenting the speed reducing means at low speeds of shaft rotation and for preventing shaft rotation at low torque loads applied thereto, said device positioned in said other cavity and including stationary and rotary members with said rotary member arranged to be connected at said other shaft end to revolve therewith, said stationary member having a yoke annulus of magnetic material, an even number of equally spaced apart magnetic poles extending inwardly from said annulus to form a bore having inner pole faces of alternate polarity, and a rotary member adapted to be connected to revolve with the rotor and shaft assembly, said rotary member being formed of magnetizable material and having a central hub section and a number of equally spaced apart salients projecting outwardly therefrom toward the stationary member in spaced relationship therewith, the ratio of the number of magnetic poles to the number of salients being an odd integer, and the total circumferential length of said salients at the bore not substantially exceeding the range of 40% to 48% of the bore circumference.

10. A dynamoelectric machine comprising a stator, a rotor, a shaft carrying said rotor for relative rotation with said stator, means for rapidly reducing the speed of rotation from running speed, and a torque producing device for augmenting the speed reducing means at lower speeds of shaft rotation and for preventing rotary motion of said shaft below a predetermined torque load comprising a stationary member including a yoke annulus of magnetic material having angularly spaced apart poles extending away from said annulus, and a rotary member connected to said shaft for revolution with said rotor, said rotary member including a plurality of spaced apart poles projecting toward the poles of said stationary member in spaced relationship therewith to define a bore, the poles of one of said members being even in number and of permanently alternate polarity at said bore.

11. The dynamoelectric machine of claim 10 in which the machine includes a housing forming a first cavity and having an end frame mounting bearing means for journalling one end of the shaft, said end frame including walls forming a second cavity in communication with said first cavity, said stator mounted within said first cavity, said shaft extending from said first cavity into said second cavity, and said torque producing device disposed in said second cavity with said yoke annulus being secured to the walls of said end frame.

References Cited by the Examiner

UNITED STATES PATENTS 2,099,849   11/37   Holmes _____ 310—93

MILTON O. HIRSHFIELD, *Primary Examiner.*